US012435069B2

(12) United States Patent
Rodriguez-Hornedo et al.

(10) Patent No.: US 12,435,069 B2
(45) Date of Patent: Oct. 7, 2025

(54) COCRYSTALS OF POSACONAZOLE, METHODS OF MAKING AND USING SAME

(71) Applicant: REGENTS OF THE UNIVERSITY OF MICHIGAN, Ann Arbor, MI (US)

(72) Inventors: Naír Rodriguez-Hornedo, Ann Arbor, MI (US); Gislaine Kuminek, Ann Arbor, MI (US); Katie L. Cavanagh, Ann Arbor, MI (US)

(73) Assignee: THE REGENTS OF THE UNIVERSITY OF MICHIGAN, Ann Arbor, MI (US)

( * ) Notice: Subject to any disclaimer, the term of this patent is extended or adjusted under 35 U.S.C. 154(b) by 879 days.

(21) Appl. No.: 17/629,899

(22) PCT Filed: Jul. 31, 2020

(86) PCT No.: PCT/US2020/044374
§ 371 (c)(1),
(2) Date: Jan. 25, 2022

(87) PCT Pub. No.: WO2021/022103
PCT Pub. Date: Feb. 4, 2021

(65) Prior Publication Data
US 2022/0259189 A1 Aug. 18, 2022

Related U.S. Application Data

(60) Provisional application No. 62/881,043, filed on Jul. 31, 2019.

(51) Int. Cl.
C07D 405/14 (2006.01)
(52) U.S. Cl.
CPC ........ C07D 405/14 (2013.01); C07B 2200/13 (2013.01)

(58) Field of Classification Search
CPC .............. C07D 405/14; C07B 2200/13; C07C 229/60; A61K 31/496
See application file for complete search history.

(56) References Cited

U.S. PATENT DOCUMENTS

| 7,078,526 B2 | 7/2006 | Remenar et al. |
| 8,435,998 B2 | 5/2013 | Wieser et al. |
| 2005/0070551 A1* | 3/2005 | Remenar .............. A61K 31/496 514/254.07 |

FOREIGN PATENT DOCUMENTS

| JP | 2007-525502 A | 9/2007 |
| WO | WO-2003/101392 A2 | 12/2003 |

(Continued)

OTHER PUBLICATIONS

Adrjanowicz et al., Molecular Dynamics of the Supercooled Pharmaceutical Agent Posaconazole Studied via Differential Scanning Calorimetry and Dielectric and Mechanical Spectroscopies, Mol. Pharm., 10(10): 3934-45 (2013).

(Continued)

Primary Examiner — Joseph K McKane
Assistant Examiner — David M Shim
(74) Attorney, Agent, or Firm — MARSHALL, GERSTEIN & BORUN LLP

(57) ABSTRACT

The disclosure generally relates to cocrystals of posaconazole and a coformer. The disclosure further relates to pharmaceutical compositions comprising the cocrystals, as well as methods of making the cocrystals, and methods of treating or preventing fungal, yeast, or dermatophyte infections using the cocrystals.

6 Claims, 5 Drawing Sheets

(56) References Cited

FOREIGN PATENT DOCUMENTS

| WO | WO-2005/092884 A1 | 10/2005 |
|---|---|---|
| WO | WO-2009/147075 A2 | 12/2009 |
| WO | WO-2018/096497 A1 | 5/2018 |

OTHER PUBLICATIONS

Avdeef, pKa Determination. In: Avdeef (ed.), Absorption and Drug Development, 2nd ed., John Wiley & Sons, Inc. (2012).
Bak et al., The Co-Crystal Approach to Improve the Exposure of a Water-Insoluble Compound: AMG 517 Sorbic Acid Co-Crystal Characterization and Pharmacokinetics. J. Pharm. Sci., 97(9):3942-56 (2008).
Berry et al., Pharmaceutical cocrystals, salts and multicomponent systems; intermolecular interactions and property based design, Adv. Drug Deliv. Rev., 117:3-24 (2017).
Bethune et al., Understanding and Predicting the Effect of Cocrystal Components and pH on Cocrystal Solubility, Cryst Growth Des., 9(9):3976-88 (2009).
Cao et al., Mechanistic Analysis of Cocrystal Dissolution, Surface pH, and Dissolution Advantage as a Guide for Rational Selection, J. Pharm. Sci., 108(1):243-51 (2019).
Cao et al., Mechanistic Basis of Cocrystal Dissolution Advantage, J. Pharm. Sci., 107(1):380-389 (2018).
Cavanagh et al., Understanding the Differences Between Cocrystal and Salt Aqueous Solubilities, J. Pharm. Sci., 107(1):113-20 (2018).
Chen et al., Cocrystals Mitigate Negative Effects of High pH on Solubility and Dissolution of a Basic Drug, Cryst Growth Des., 18(3):1358-66 (2018).
Chen et al., Sodium Lauryl Sulfate Competitively Interacts with HPMC-AS and Consequently Reduces Oral Bioavailability of Posaconazole/HPMC-AS Amorphous Solid Dispersion. Mol. Pharm., 13(8):2787-95 (2016).
Childs et al., Formulation of a danazol cocrystal with controlled supersaturation plays an essential role in improving bioavailability. Mol Pharm, 10(8):3112-27 (2013).
Courtney et al., Effect of food on the relative bioavailability of two oral formulations of posaconazole in healthy adults. Brit J Clin Pharmacol., 57(2):218-222 (2004).
Cristofoletti et al., Differences in Food Effects for 2 Weak Bases With Similar BCS Drug-Related Properties: What Is Happening in the Intestinal Lumen?, J Pharm Sci., 105(9):2712-22 (2016).
Dayo Owoyemi et al., Fluconazole: Synthesis and Structural Characterization of Four New Pharmaceutical Cocrystal Forms, Crystal Growth & Design, 19(2):648-57 (2019).
Diakidou et al., Estimation of Intragastric Drug Solubility in the Fed State: Comparison of Various Media with Data in Aspirates, Biopharm Drug Dispos., 30(6):318-25 (2009).
Ezzet et al., Oral Bioavailability of Posaconazole in Fasted Healthy Subjects, Clin. Pharmacokinet., 44(2):211-220 (2005).
Good et al., Solubility Advantage of Pharmaceutical Cocrystals, Crystal Growth & Design, 9(5):2252-64 (2009).
Hens et al., Evaluation and optimized selection of supersaturating drug delivery systems of posaconazole (BCS class 2b) in the gastrointestinal simulator (GIS): An in vitro-in silico-in vivo approach, Eur. J. Pharm. Sci., 115:258-269 (2018).
International Application No. PCT/US20/44374, International Search Report and Written Opinion, dated Nov. 4, 2020.
Kale et al., Challenges in translational development of pharmaceutical cocrystals, J. Pharm. Sci., 106:457-70 (2017).
Kastelic et al., A 1:1 cocrystal of fluconazole with salicylic acid, Acta Crystallogr C., 67(Pt. 9):o370-2 (2011).
Kastelic et al., Fluconazole Cocrystals with Dicarboxylic Acids. Crystal Growth & Design, 10(11):4943-53 (2010).
Krishna et al., Pharmacokinetics and Absorption of Posaconazole Oral Suspension under Various Gastric Conditions in Healthy Volunteers. Antimicrob Agents Chemother., 53(3), 958-966 (2009).
Kumar et al., Pharmaceutical cocrystals and a nitrate salt of voriconazole, CrystEngComm., 16:4722-4731 (2014).
Kuminek et al., Cocrystals to facilitate delivery of poorly soluble compounds beyond rule of 5, Adv. Drug Deliv. Rev., 101:143-66 (2016).
Kuminek et al., How cocrystals of weakly basic drugs and acidic coformers might modulate solubility and stability, Chem Commun (Camb), 52(34):5832-5 (2016).
Kuminek et al., Measurement and Mathematical Relationships of Cocrystal Thermodynamic Properties. In: Li et al. (eds.), Pharmaceutical Crystals, John Wiley & Sons, Inc. 2019.
Kuminek et al., Posaconazole cocrystal with superior solubility and dissolution behavior, Crystal Growth & Design, 19(11):6592-602 (2019).
Maegawa et al., Baseline characteristics and interim (3-month) efficacy and safety data from Stella-Long Term, a long-term post-marketing surveillance study of ipragliflozin in Japanese patients with type 2 diabetes in real-world clinical practice, Exp. Opin. Pharmacotherapy, 17:1985-94 (2016).
Martin et al., Ketoconazole Salt and Co-crystals with Enhanced Aqueous Solubility. Crystal Growth & Design, 13(10):4295-304 (2013).
McNamara et al., Use of a glutaric acid cocrystal to improve oral bioavailability of a low solubility API, Pharm Res., 23(8):1888-1897 (2006).
McQuiston et al., The structure of posaconazole and its solvates with methanol, and dioxane and water: Difluorophenyl as a hydrogen bond donor, J. Mol. Structure, 1179:477-486 (2019).
Rodriguez-Hornedo et al., Reaction crystallization of pharmaceutical molecular complexes, Mol. Pharm., 3(3):362-7 (2006).
Schiller et al., Posaconazole: An extended-spectrum triazole antifungal agent, Clin. Ther., 29(9):1862-86 (2007).
Schultheiss et al., Pharmaceutical Cocrystals and Their Physicochemical Properties, Crystal Growth & Design, 9(6):2950-67 (2009).
Shan et al., Impact of pharmaceutical cocrystals: the effects on drug pharmacokinetics, Expert Opin Drug Metab Toxicol., 10(9):1255-71 (2014).
Shevchenko et al., A new cocrystal and salts of itraconazole: Comparison of solid-state properties, stability and dissolution behavior. Int. J. Pharm., 436(1):403-9 (2012).
Shevchenko et al., Diversity in Itraconazole Cocrystals with Aliphatic Dicarboxylic Acids of Varying Chain Length, Crystal Growth & Design, 13(11): 4877-84 (2013).
Taylor et al., Physical chemistry of supersaturated solutions and implications for oral absorption, Adv. Drug Deliv. Rev., 101:122-142 (2016).
U.S. Food and Drug Administration, Noxafil Tablets Clinical Pharmacology and Biopharmaceutics Review(s). Center for Drug Evaluation and Research, Application No. 205053Orig1s000 (2013).
Walravens et al., Effect of pH and comedication on gastrointestinal absorption of posaconazole: monitoring of intraluminal and plasma drug concentraitons. Clin. Pharmacokinet., 50(11):725-34 (2011).
Wang et al., Aggregation of Hydroxypropyl Methylcellulose Acetate Succinate under Its Dissolving pH and the Impact on Drug Supersaturation. Molecular Pharmaceutics, 15(10):4643-53 (2018).
Panzade et al., Pharmaceutical Cocrystal: An Antique and Multifaceted Approach, Curr. Drug Deliv., 14(8):1097-105 (2017).
Issa et al., Screening for cocrystals of succinic acid and 4-aminobenzoic acide, CrystEngComm., 14:2454 (2012).
Takata, Cocrystal, Pharmaceutics, 69(2):112-6 (2009).
European Patent Application No. 20846887, Supplementary Partial European Search Report, dated Jul. 13, 2023.

* cited by examiner

COCRYSTALS OF POSACONAZOLE, METHODS OF MAKING AND USING SAME

STATEMENT OF GOVERNMENT SUPPORT

This invention was made with government support under GM107146 awarded by the National Institutes of Health. The government has certain rights in the invention.

BACKGROUND

Cocrystals have emerged as a useful solubility-enabling technology. Drug solid-state forms that enhance solubility include pharmaceutical materials such as salts, polymorphs, and amorphous systems. Cocrystals are distinguished in that they are composed of two or more neutral molecular components in a crystal lattice with a well-defined stoichiometry, they are formed via non-covalent interactions, and the components are solids at room temperature. Their ability to impart solubility advantage to poorly water-soluble drugs enables cocrystals to solve absorption and bioavailability problems. In addition to their solubility enhancement, cocrystals modulate pH dependent dissolution, alter microenvironment pH, and improve low and erratic bioavailability problems.

Posaconazole (PSZ) is a weakly dibasic drug that belongs to Class II of the Biopharmaceutical Classification System (BCS), has an IUPAC name of 3H-1,2,4-Triazol-3-one, 4-[4-[4-[4-[[5-(2,4-difluorophenyl)tetrahydro-5-(1H-1,2,4-triazol-1-yl-methyl)-3-furanyl]methoxy]phenyl]-1-piperazinyl]phenyl]-2-(1-ethyl-2-hydroxypropyl]-2,4-dihydro-, [3R-[3α(1S*,2S*),5α]]-; or 4-[p-[4-[p[[3R,5R)-5-(2,4-Difluorophenyl)tetrahydro-5-(1H-1,2,4-triazol-1-ylmethyl)-3-furyl]methoxy]phenyl]-1-piperazinyl]phenyl]-1-[(1S,2S)-1-ethyl-2-hydroxypropyl]-Δ²-1,2,4-triazolin-5-one, and has the structure

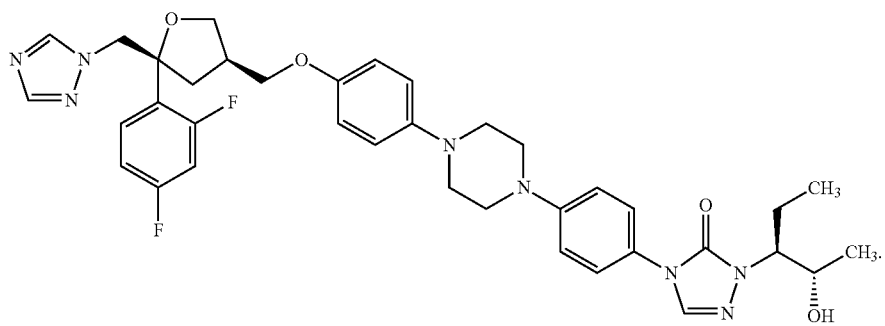 [SMILES: CC[C@@H]([C@H](C)O)n1ncn(-c2ccc(N3CCN(c4ccc(OC[C@@H]5CO[C@@](Cn6cncn6)(c6ccc(F)cc6F)C5)cc4)CC3)cc2)c1=O]

PSZ is characterized by its low aqueous solubility of <1 μg/mL and high lipophilicity, Log P 4.6. PSZ is also characterized by its large positive food effect and high solubility pH-dependence, which have resulted in low and erratic bioavailability (having a fraction absorbed <30%) in addition to daily doses of PSZ that are over 1000 times higher than what can be dissolved in a luminal volume of 250 mL.

PSZ is an extended-spectrum triazole antifungal agent for prophylaxis and treatment of invasive yeast and mold infection. Current oral formulations include a suspension and a delayed-release tablet. While interpatient variability was reduced with the development of the tablet, therapeutic drug monitoring indicates that existing oral formulations commonly result in inadequate treatment, as they do not reach the pharmacological targets as effectively as intravenous administration.

A need exists for salts and cocrystals of PSZ that can be formulated as suspensions and solid dosage forms with improved and less variable bioavailability, better water solubility, dissolution, stability, and properties suitable for pharmaceutical processing.

SUMMARY

Provided herein are cocrystals comprising posaconazole and a coformer.

In various embodiments, the coformer comprises a functional group selected from the group consisting of carboxyl, hydroxyl, carbonyl, amine, amide, nitro, and any combination thereof. In various embodiments, the coformer comprises phenol, 2-aminobenzoic acid, 3-aminobenzoic acid, 4-aminobenzoic acid, 5-nitroisophthalic acid, adipic acid, arginine, aspartic acid, benzoic acid, caffeine, cholic acid, cinnamic acid, citric acid, fumaric acid, glutamic acid, glutaric acid, hippuric acid, m-nitrobenzoic acid, maleic acid, malic acid, malonic acid, mandelic acid, methionine, methylparaben, nicotinic acid, nicotinamide, oxalic acid, phthalic acid, 2-hydroxybenzoic acid, 3-hydroxybenzoic acid, 4-hydroxybenzoic acid, saccharin, suberic acid, succinic acid, d-tartaric acid, l-tartaric acid, DL-tartaric acid, theophylline, tryptophan, o-toluic acid, vanillin, or a mixture thereof.

In various embodiments, the coformer comprises 4-aminobenzoic acid (4ABA). In various embodiments, posaconazole and 4ABA are present in a molar ratio of 1:4 to 4:1 posaconazole: 4ABA. In various embodiments, the molar ratio of posaconazole:4ABA is 2:3. In various embodiments, the cocrystal is characterized by an X-ray powder diffraction (XRPD) pattern comprising peaks at 5.8, 10.3, 11.5, 18.9, 19.3, 21.7, 22.4±0.2° 2θ using Cu Kα radiation. In various embodiments, the cocrystal is further characterized by XRPD pattern peaks at 12.9, 13.3, 20.1, 25.0, 25.3, 26.3±0.2° 2θ using Cu Kα radiation. In various embodiments, the cocrystal has an XRPD pattern substantially as shown in FIG. 3.

In various embodiments, the cocrystal has an endothermic transition is at 154.1±0.6° C., as measured by differential scanning calorimetry (DSC). In various embodiments, the cocrystal has a Raman spectrum substantially as shown in FIG. 6.

The disclosure further provides methods of making the cocrystals provided herein. In various embodiments, the method comprises admixing posaconazole and the coformer in a solvent to form the cocrystal, and isolating the cocrystal. In various embodiments, the admixing is carried out at 0° C. to 40° C. In various embodiments, the admixing is carried out at 20° C. to 40° C. In various embodiments, the solvent comprises acetonitrile, methanol, acetone, ethyl acetate, ethanol, 1-propanol, 2-propanol, chloroform, or mixtures thereof. In various embodiments, the solvent comprises acetonitrile, methanol, or ethyl acetate. In various embodiments, the solvent comprises acetonitrile.

Further provided are pharmaceutical compositions comprising the cocrystal according to the disclosure and a pharmaceutically acceptable carrier. In various embodiments, the composition is in the form of a tablet, capsule, or suspension.

Also provided are methods of preventing or treating a fungal, yeast, or dermatophyte infection in a subject in need thereof. In various embodiments, the method comprises administering to the subject an effective amount of the cocrystal or the composition according to the disclosure. In various embodiments, the subject is a mammal. In various embodiments, the mammal is a human. In various embodiments, the administering is via oral administration of the cocrystal or composition.

Further aspects and advantages will be apparent to those of ordinary skill in the art from a review of the following detailed description. The description hereafter includes specific embodiments with the understanding that the disclosure is illustrative, and is not intended to limit the invention to the specific embodiments described herein.

DETAILED DESCRIPTION

Provided herein are cocrystals including posaconazole and a coformer. The disclosed cocrystals are distinct from a crystal of the drug alone ("drug crystal") or a drug crystal that is solvated (e.g., includes a solvent in the crystalline structure). Drug crystal solvates can include solvents such as water, methanol, and dioxane. Cocrystals and solvates are crystals having both the drug (posaconazole) and another component (cofomer or solvent, respectively), but a coformer is solid at room temperature, whereas a solvent of a solvate is not.

Advantageously, the cocrystals of the disclosure have significantly improved biopharmaceutical properties as compared to the drug as a crystal alone (e.g., without a coformer), such as increased dissolution and solubility at biorelevant pH levels. Furthermore, the cocrystals of the disclosure are capable of achieving dissolution concentrations in biorelevant media that can be up to 16-fold higher than drug crystals alone. These benefits can lead to enhanced biopharmaceutical properties such as less erratic and enhanced absorption, pH, and food independent bioavailability.

As noted above, a coformer is solid a room temperature. In embodiments, the coformer comprises a functional group selected from the group consisting of carboxyl, hydroxyl, carbonyl, amine, amide, nitro, and any combination thereof. Examples of suitable coformers include, but are not limited to, phenol, 2-aminobenzoic acid, 3-aminobenzoic acid, 4-aminobenzoic acid, 5-nitroisophthalic acid, adipic acid, arginine, aspartic acid, benzoic acid, caffeine, cholic acid, cinnamic acid, citric acid, fumaric acid, glutamic acid, glutaric acid, hippuric acid, m-nitrobenzoic acid, maleic acid, malic acid, malonic acid, mandelic acid, methionine, methylparaben, nicotinic acid, nicotinamide, oxalic acid, phthalic acid, 2-hydroxybenzoic acid, 3-hydroxybenzoic acid, 4-hydroxybenzoic acid, saccharin, suberic acid, succinic acid, d-tartaric acid, l-tartaric acid, DL-tartaric acid, theophylline, tryptophan, o-toluic acid, vanillin, or mixtures thereof. In embodiments, the coformer is 4-aminobenzoic acid. In embodiments, the coformer is 4-hydroxybenzoic acid. In embodiments, the coformer is malic acid.

The posaconazole and the coformer can be present in any suitable molar ratio within the cocrystal. In embodiments, the posaconazole and the coformer can be present in a molar ratio of 1:10 to 10:1, 1:8 to 8:1, 1:4 to 4:1, or 1:2 to 2:1, for example 1:10, 1:8, 2:9, 1:5, 2:5, 2:3, 3:2, 5:2, 5:1, 9:2, 8:1, or 10:1 posaconazole to coformer.

Cocrystals

4-Aminobenzoic Acid (4ABA) Cocrystal

In embodiments, the coformer comprises 4-aminobenzoic acid (4ABA). In embodiments, the posaconazole and the 4ABA can be present in the cocrystal in a molar ratio of 1:4 to 4:1, 1:3 to 3:1, or 1:2 to 2:1, for example 1:4, 1:3, 1:2, 1:1, 2:1, 3:1, or 4:1 posaconazole to 4ABA. In embodiments, the molar ratio of posaconazole to 4ABA in the cocrystal is 2:3.

Figure 3:
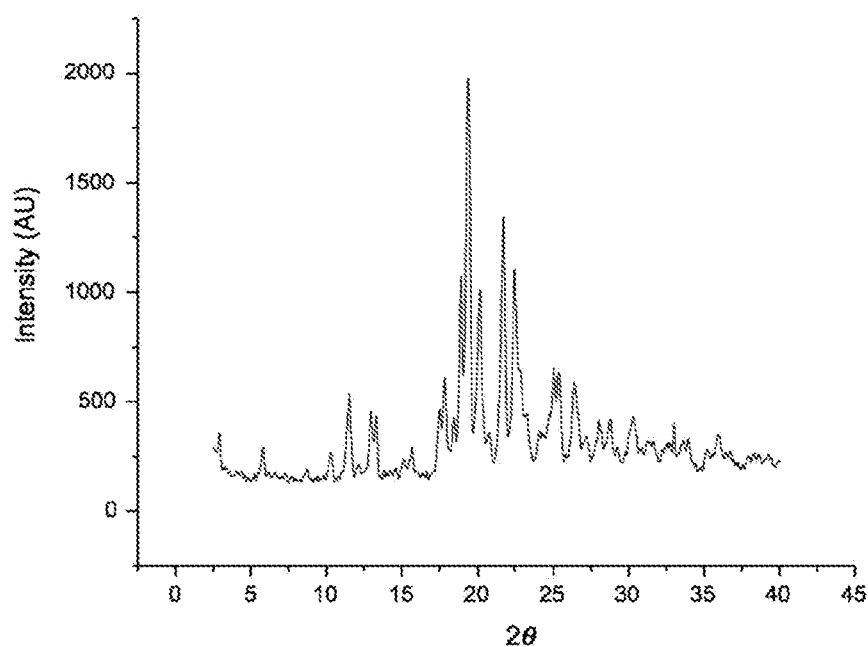
FIG. 3 shows an X-Ray Powder Diffraction spectrum of a cocrystal according to the disclosure (PSZ-4ABA).

The 4ABA cocrystal can be characterized by an X-ray powder diffraction pattern (XRPD), obtained as set forth in the Examples, having peaks at about 5.8, 10.3, 11.5, 18.9, 19.3, 21.7, and 22.4±0.2° 2θ using Cu Kα radiation. The 4ABA cocrystal can optionally be further characterized by an XRPD pattern having peaks at 12.9, 13.3, 20.1, 25.0, 25.3, and 26.3±0.2° 2θ using Cu Kα radiation. The 4ABA cocrystal can optionally be further characterized by an XRPD pattern having peaks as shown in FIG. 3, as set forth in the Examples. In embodiments, the 4ABA cocrystal has an XRPD pattern substantially as shown in FIG. 3, wherein by "substantially" is meant that the reported peaks can vary by about ±0.2°. It is well known in the field of XRPD that while relative peak heights in spectra are dependent on a number of factors, such as sample preparation and instrument geometry, peak positions are relatively insensitive to experimental details.

Figure 4:
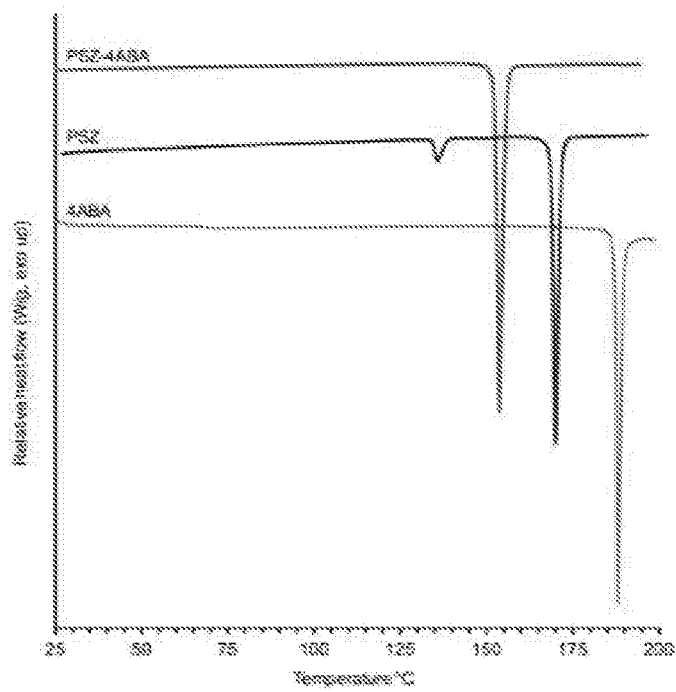
FIG. 4 shows Differential Scanning Calorimetry (DSC) thermograms of a cocrystal according to the disclosure (PSZ-4ABA), drug (PSZ), and coformer (4ABA).

Differential scanning calorimetry (DSC) thermograms can be obtained, as set forth in the Examples, for the 4ABA cocrystal. The DSC curve indicates an endothermic transition at about 154.1±0.6° C. Thus, in some embodiments, the 4ABA cocrystal can be characterized by a DSC thermogram having a melting endotherm with an onset in a range of about 149° C. to about 159° C. For example, in embodiments, the 4ABA cocrystal is characterized by DSC, as shown in FIG. 4.

Figure 6:
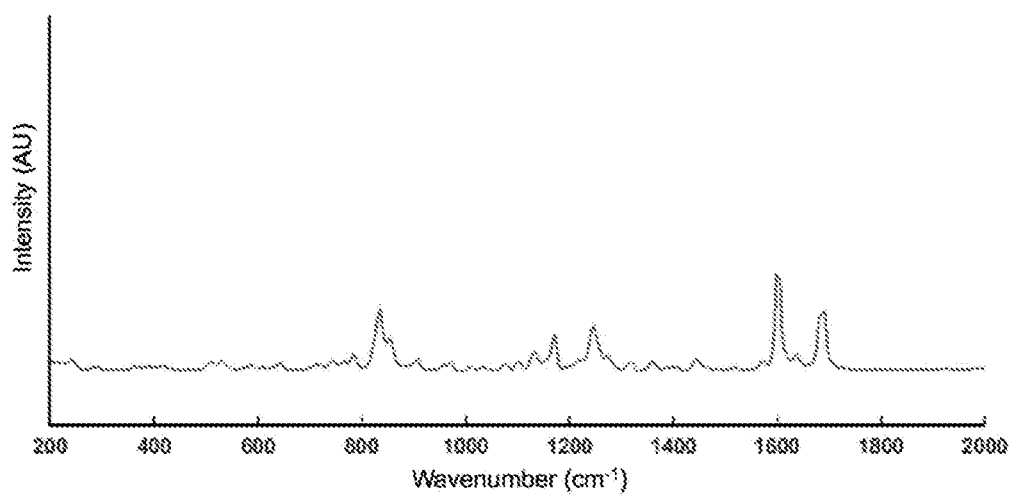
FIG. 6 shows a Raman spectrum of a cocrystal according to the disclosure (PSZ-4ABA).

The 4ABA cocrystal can also be characterized by Raman spectroscopy. For example, the 4ABA cocrystal can have band shifts at 832, 1173 and 1242 and 1686 cm$^{-1}$. In embodiments, the 4ABA cocrystal can be characterized by a Raman spectrum substantially as shown in FIG. 6, wherein by "substantially" is meant that the reported peaks can vary by about 2 cm$^{-1}$.

Methods of Making Cocrystals

Also provided herein are methods of making the cocrystals as described herein. In embodiments, the method comprises admixing posaconazole (PSZ) and the coformer in a solvent to form the cocrystal, and isolating the cocrystal.

In embodiment, the admixing is carried out at 0° C. to 40° C., 0° C. to 20° C., 20° C. to 40° C., 25° C. to 35° C. or 30° C. to 40° C., for example 0, 4, 10, 20, 22, 25, 27, 30, 32, 35, 37, or 40° C.

In general, the process for making the cocrystals can be carried out in any solvent system in which both the PSZ and the coformer are sufficiently soluble. Examples of suitable solvents include, but are not limited to acetonitrile, methanol, acetone, ethyl acetate, ethanol, 1-propanol, 2-propanol, chloroform, and mixtures thereof. In embodiments, the solvent comprises acetonitrile.

Success of the cocrystal formation can be dependent on factors such as the selection of the coformer, the solvent and temperature at which the PSZ and coformer are mixed, the initial concentrations of the PSZ and coformer, pH, rate of reactant mixing, rate of cooling, and/or rate of evaporation, among others.

In embodiments wherein the cocrystal is a 4ABA cocrystal and the solvent comprises acetonitrile, methanol, or ethyl acetate, the PSZ can be present in a concentration at least 0.5, 1.0, 1.5, 2.0, 2.5, or 3.0 times PSZ solubility in acetonitrile, methanol, or ethyl acetate, and can be present in concentrations of 0.5 to 1.0 times 4ABA solubility.

Cocrystals can be formed using a number of processes, including reaction crystallization, slurry of cocrystal component mixture, solvent evaporation, solvent sorption, cooling, mechanochemical methods such as cogrinding cocrystal reactants without or with solvent (liquid assisted grinding), heat induced, hot melt extrusion, spray drying, wet granulation, dry granulation, solvent freezing, crystallization in supercritical fluids such as $CO_2$. Formation, purity, composition, and stoichiometry of cocrystal can depend on solvents, additives such as salts, buffer components, sugars, polymers, surfactants, pH, temperature, pressure, mass, concentrations, rates of addition of cocrystal components, rate of cooling, and rate of evaporation. Selection of these parameters is well within the skill of the ordinarily skilled person, in view of the guidance provided in the examples below.

Pharmaceutical Compositions, Dosages, and Routes of Administration

Also provided herein are pharmaceutical compositions comprising the cocrystal as described herein and a pharmaceutically acceptable carrier. In embodiments, the carrier comprises an excipient.

The phrase "pharmaceutically acceptable" is employed herein to refer to those ligands, materials, compositions, and/or dosage forms which are, within the scope of sound medical judgment, suitable for use in contact with the tissues of human beings and animals without excessive toxicity, irritation, allergic response, or other problem or complication, commensurate with a reasonable benefit/risk ratio. The compositions described herein can be formulated for any form of administration. In embodiments, the composition is for oral administration. In embodiments, the composition is in capsule or tablet form, for example, an immediate release or delayed-release tablet. In embodiments, the composition is an oral suspension. In embodiments, the composition is for intravenous injection.

The phrase "pharmaceutically acceptable carrier" as used herein means a pharmaceutically acceptable material, composition, or vehicle, such as a liquid or solid filler, diluent, excipient, solvent or encapsulating material. As used herein the language "pharmaceutically acceptable carrier" includes buffers, sterile water for injection, solvents, dispersion media, coatings, antibacterial and antifungal agents, isotonic and absorption delaying agents, and the like, compatible with pharmaceutical administration. Each carrier must be "acceptable" in the sense of being compatible with the other ingredients of the formulation and not injurious to the patient. Some examples of materials which can serve as pharmaceutically acceptable carriers include: (1) sugars, such as lactose, glucose, and sucrose; (2) starches, such as corn starch, potato starch, and substituted or unsubstituted 3-cyclodextrin; (3) cellulose, and its derivatives, such as sodium carboxymethyl cellulose, ethyl cellulose, cellulose acetate, hydroxypropyl methylcellulose (HPMC), hydroxypropyl methylcellulose acetate succinate (HPMCAS); (4) polymers such as polyvinylpyrrolidone (PVP), polyvinylpyrrolidone-vinyl acetate (PVP/VA); (5) surfactants such as sodium lauryl sulfate, polysorbates (Tween), polyoxyethylene stearates (Myri), polyoxyethylene alkyl ethers (Brij), polyethylene glycol, polyvinyl acetate and polyvinylcaprolactame-based graft copolymer (Soluplus), D-α-tocopheryl polyethylene glycol 1000 succinate (TPGS); (6) gelatin; (7) talc; (8) excipients, such as cocoa butter and suppository waxes; (9) lipids such as Captex, Capmul and Cremophore; (10) oils, such as peanut oil, cottonseed oil, safflower oil, sesame oil, olive oil, corn oil, and soybean oil; (11) glycols, such as propylene glycol; (12) polyols, such as glycerin, sorbitol, mannitol, and polyethylene glycol; (13) esters, such as ethyl oleate and ethyl laurate; (14) buffering agents, such as magnesium hydroxide and aluminum hydroxide; (15) alginic acid; (16) pyrogen-free water; (17) isotonic saline; (18) Ringer's solution; (19) ethyl alcohol; (20) phosphate buffer solutions; and (21) other non-toxic compatible substances employed in pharmaceutical formulations. In certain embodiments, pharmaceutical compositions provided herein are non-pyrogenic, i.e., do not induce significant temperature elevations when administered to a patient.

Wetting agents, drug solubilizers, emulsifiers such as sodium lauryl sulfate, Tween, Brij, Myri, Solubplus, and lubricants such as magnesium stearate, as well as coloring agents, release agents, coating agents, sweetening, flavoring, and perfuming agents, preservatives and antioxidants can also be present in the compositions as excipients.

Precipitation inhibitors or cocrystal stabilizers that prevent or slow cocrystal to drug conversions during processing, storage, and dissolution, such as surfactants, lipids, complexing agents, and polymers can also be present in the formulation. Cocrystals are generally more soluble than the parent drug and are therefore predisposed to convert to less soluble forms of the drug, thus formulations can include excipients to stabilize cocrystal and/or slow conversions to other less soluble forms.

Examples of pharmaceutically acceptable antioxidants as excipient include: (1) water soluble antioxidants, such as ascorbic acid, cysteine hydrochloride, sodium bisulfate, sodium metabisulfite, sodium sulfite, and the like; (2) oil-soluble antioxidants, such as ascorbyl palmitate, butylated hydroxyanisole (BHA), butylated hydroxytoluene (BHT), lecithin, propyl gallate, alpha-tocopherol, and the like; and (3) metal chelating agents, such as citric acid, ethylenediamine tetraacetic acid (EDTA), sorbitol, tartaric acid, phosphoric acid, and the like.

A pharmaceutical composition can also contain adjuvants such as preservatives, wetting agents, emulsifying agents, and dispersing agents. Prevention of the action of microorganisms may be ensured by the inclusion of various antibacterial and antifungal agents, for example, paraben, chlorobutanol, phenol sorbic acid, and the like. It may also be desirable to include tonicity-adjusting agents, such as sugars and the like into the compositions. In addition, prolonged absorption of an injectable pharmaceutical form may be brought about by the inclusion of agents which delay absorption such as aluminum monostearate and gelatin.

Compositions prepared as described herein can be administered in various forms, depending on the disorder to be treated and the age, condition, and body weight of the patient, as is well known in the art. For example, where the compositions are to be administered orally, they may be formulated as tablets, capsules, granules, powders, or suspensions; or for parenteral administration, they may be formulated as injections (intravenous, intramuscular, or subcutaneous), drop infusion preparations, or suppositories. These formulations can be prepared by conventional means in conjunction with the methods described herein, and, if desired, the active ingredient may be mixed with any conventional additive or excipient, such as a binder, a disintegrating agent, a lubricant, a corrigent, a solubilizing agent, a suspension aid, an emulsifying agent, or a coating agent. In embodiments, the composition is an oral composition. In some cases, the oral composition is a tablet, capsule, or suspension.

The pharmaceutical compositions can be included in a container, pack, or dispenser together with instructions for administration.

Actual dosage levels of the active ingredients in the pharmaceutical compositions provided herein may be varied so as to obtain "therapeutically effective amount," which is an amount of the active ingredient effective to achieve the desired therapeutic response for a particular patient, composition, and mode of administration, without being toxic to the patient.

The concentration of a compound provided herein in a pharmaceutically acceptable mixture will vary depending on several factors, including the dosage of the compound to be administered, the pharmacokinetic characteristics of the cocrystal employed, and the route of administration. Typical dose ranges can include from about 0.01 to about 50 mg/kg of body weight per day, given in 1-4 divided doses. The dosage will be a therapeutically effective amount depending on several factors including the overall health of a patient, and the formulation and route of administration of the cocrystal.

Methods of Use

The cocrystals or the pharmaceutical compositions described herein may be used in the treatment or prevention of fungal, yeast, and/or dermatophyte infection. For example, the cocrystals can be used in the treatment or prevention of blastomycosis, aspergillosis, histoplasmosis, onychomycosis, coccidioidomycosis, paracoccidioidomycosis, cryptococcosis, mucormycosis, dermatophyte, and/or candidiasis infections. In some cases, the treatment is for oropharyngeal candidiasis or oropharyngeal candidiasis that is refractory to itraconazole and/or fluconazole.

In embodiments, the method can include administering to a subject in need thereof an effective amount of the cocrystal or the pharmaceutical composition as described herein. In embodiments, the subject is a mammal. For example, in embodiment, the subject is a human.

The amount of the cocrystal of the pharmaceutical composition that is administered to the subject will depend on the nature of the disease or disorder (e.g., acute or chronic), as well as the type of disease or disorder, and the route of administration. The dose, dose frequency, or both may also vary according to age, body weight, response, the past medical history of the patent, and consideration of whether the patient will be concurrently or concomitantly taking other drugs or pharmaceuticals. Suitable dosing regimens are well within the purview of the person of ordinary skill in the art with due consideration of such factors by following, for example, dosages and dose regimens reported in the literature and known in the art.

"Treatment" or "treating" includes one or more of: a) inhibiting a disease or disorder; b) slowing or arresting the development of clinical symptoms of a disease or disorder; and/or c) relieving a disease or disorder that is, causing the regression of clinical symptoms. The term covers both complete and partial reduction of the condition or disorder, and complete or partial reduction of clinical symptoms of a disease or disorder. Thus, cocrystals described herein, or the pharmaceutical compositions described herein may prevent an existing disease or disorder from worsening, assist in the management of the disease or disorder, or reduce or eliminate the disease or disorder. "Prevention," that is, causing the clinical symptoms of the disease or disorder not to develop, includes the prophylactic administration of a cocrystal or composition described herein to a subject (i.e., an animal, preferably a mammal, most preferably a human) believed to be in need of preventative treatment, such as, for example, chronic mucocutaneous candidiasis. In some cases, the preventative treatment is for prophylaxis of an invasive *Aspergillus* or *Candida* infection.

In jurisdictions that forbid the patenting of methods that are practiced on the human body, the meaning of "administering" of a composition to a human subject shall be restricted to prescribing a controlled substance that a human subject will self-administer by any technique (e.g., orally, inhalation, topical application, injection, insertion, etc.). The broadest reasonable interpretation that is consistent with laws or regulations defining patentable subject matter is intended. In jurisdictions that do not forbid the patenting of methods that are practiced on the human body, the "administering" of compositions includes both methods practiced on the human body and also the foregoing activities.

It is to be understood that while the disclosure is read in conjunction with the detailed description thereof, the foregoing description is intended to illustrate and not limit the scope of the disclosure, which is defined by the scope of the appended claims. Other aspects, advantages, and modifications are within the scope of the following claims.

EXAMPLES

The following examples are provided for illustration and are not intended to limit the scope of the disclosure.

Example 1—Preparation and Evaluation of PSZ-4ABA Cocrystals

Materials

Posaconazole was purchased from BOC Sciences (Shirley, NY) and used as received. 4-aminobenzoic acid, acetic acid, sodium acetate anhydrous, dipotassium hydrogen phosphate, trifluoroacetic acid, and sodium chloride were purchased from Sigma-Aldrich (St. Louis, MO) and used as received. Sodium hydroxide was purchased from J. T. Baker Chemical Company (Phillipsburg, NJ). HPLC-grade methanol, sodium phosphate monobasic and hydrochloric acid were purchased from Fisher Scientific (Fair Lawn, NJ). FaSSIF/FeSSIF product was purchased from Biorelevant.com Ltd. (London, UK).

Cocrystal Synthesis

PSZ-4ABA cocrystals were prepared by reaction crystallization method in acetonitrile at room temperature. 350 mg of drug (equivalent to 3 times drug solubility) was added to a coformer solution (~0.17 M) and magnetically stirred for 2 hours. The suspension was filtered through 0.45 μm pore membrane and the solid phase was characterized by PXRD, DSC, and Raman spectroscopy.

Single crystals of PSZ-4ABA were obtained by slow evaporation from acetonitrile. 6.4 mg of PSZ and 71.4 mg of 4ABA were dissolved in 2 mL of acetonitrile. The solution was filtered and transferred to a glass vial, covered with punctured Parafilm® and allowed to evaporate at 4° C. Single crystals were obtained and isolated from the solution by 48 h, and characterized by Raman spectroscopy and single crystal X-ray diffraction (SCXRD).

Cocrystal Analysis

Single Crystal X-Ray Diffraction (SCXRD)

Crystals suitable for SCXRD characterization were mounted in a cryoloop with Fomblin protective oil. Data were collected on a Bruker AXS-KAPPA APEX 11 diffractometer with graphite-monochromated radiation (Mo Kα, λ=0.71073 Å) at 167(2) K. The X-ray generator was operated at 50 kV and 30 mA, and the data collection was monitored by the APEX2 program. All data were corrected for Lorentzian, polarization, and absorption effects using the SAINT and SADABS programs. The structure was solved by the Intrinsic Phasing methods using SHELXT-2014 incorporated in the Bruker diffractometer interface. SHELXL-2017/1, included in the program package WINGX-Version 2014.1 was used for refinement using full matrix least-squares on $F^2$. All the non-hydrogen atoms were refined with anisotropic thermal parameters, and the hydrogen atoms were inserted in idealized positions and allowed to refine riding on the parent carbon atom, except those belonging to the amine groups and to the chiral carbons, which were located from the electron density map and allowed to refine freely. Graphical representations were prepared using Mercury version 3.10.3.

Figure 1:
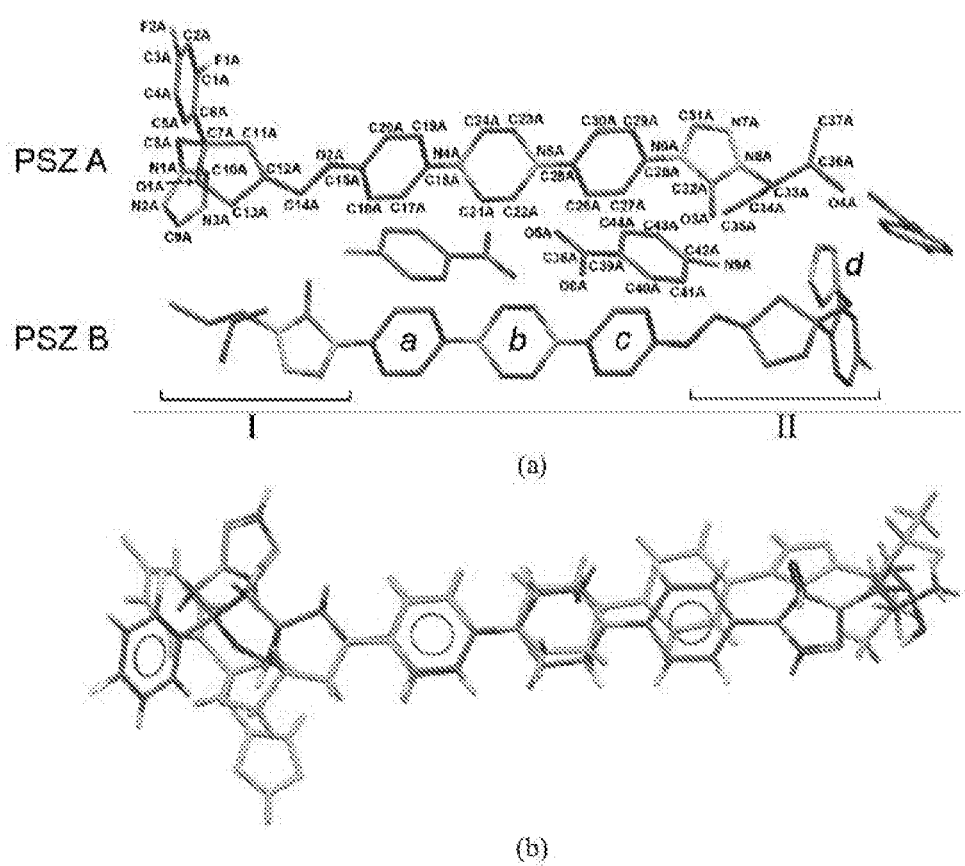
FIG. 1 at (a) shows the structure of a posaconazole-4-aminobenzoic acid (PSZ-4ABA) cocrystal having a 2:3 stoichiometric ratio, and at (b) shows an asymmetric overlay of the 2 posaconazole molecules in the PSZ-4ABA cocrystal.

The SCXRD spectra showed that the cocrystal had a stoichiometry of 2:3 PSZ:4ABA, as shown in FIG. 1. The largest conformational changes involved fragments I and II, as shown in FIG. 1 at (a), positioned at the left and right ends of the PSZ molecules, and the torsion angles involving these fragments in one molecule were symmetric to the corresponding ones of the other molecule. Most notably, (i) the plane defined by the a and c phenyl rings made an angle of 27.33° with the plane sustaining the piperazine b ring in the PSZ A molecule and a 23.77° in the PSZ B molecule, and (ii) the angle between the planes of the two phenyls and that of the triazole d group are very different in PSZ A (18.76°) and PSZ B (42.67°). Without intending to be bound by theory, it is believed that these differences may be related to the distinct hydrogen bond patterns formed by the PSZ A/4ABA and PSZ B/4ABA pairs.

As shown in FIG. 1 at (b), the two molecules of PSZ in the cocrystal asymmetric unit were not superimposable. The two PSZ compounds in the cocrystal interacted through O—H . . . N, O—H . . . O, N—H . . . O, and N—H . . . N hydrogen bonds. It was found that the PSZ A molecule interacted with the 4ABA via three hydrogen bonds, whereas the PSZ B molecule interacted with the 4ABA via only two hydrogen bonds. Therefore, and without intending to be bound by theory, the PSZ A molecule is more constrained in the crystal packing than its PSZ B counterpart, which explains the existence of conformational differences between the two molecules.

Powder X-Ray Diffraction (PXRD)

Diffractograms were obtained using a Rigaku MiniFlex diffractometer (Danvers, MA), equipped with a Kα copper radiation (λ=1.5418 Å), operating with a 15 mA current and 30 kV voltage. The measurements were performed at room temperature, at a scan rate of 2.5°/min over a 2θ range of 2° to 40°.

Figure 2:
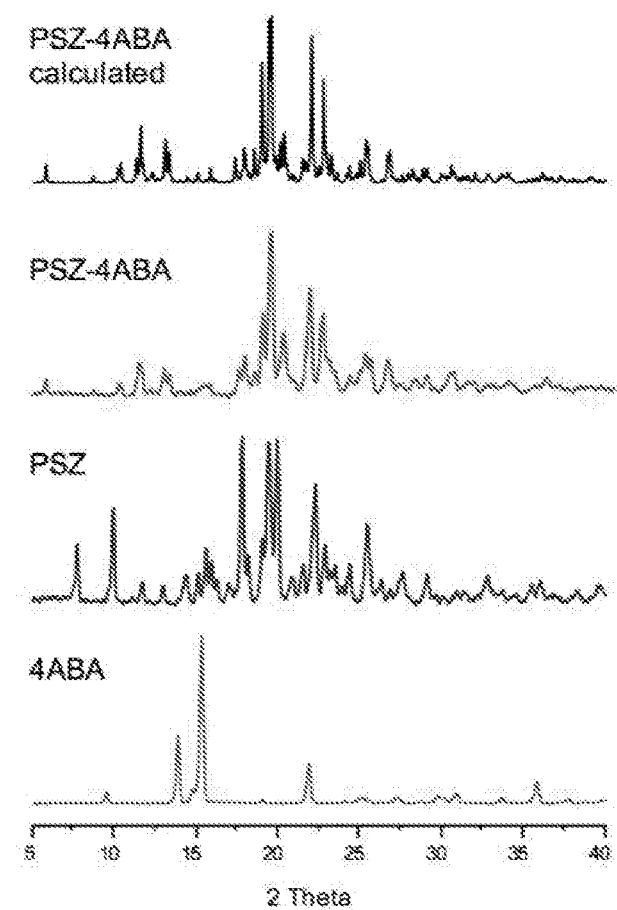
FIG. 2 shows X-Ray Powder Diffraction (XRPD) spectra of a cocrystal according to the disclosure (PSZ-4ABA), drug (PSZ), and coformer (4ABA).

The PXRD spectra of PSZ-4ABA, PSZ, and 4ABA are shown in FIG. 2. FIG. 3 shows the PXRD spectrum of PSZ-4ABA, alone. The spectrum of PSZ-4ABA cocrystal displayed unique patterns in comparison to PSZ and 4ABA, alone. In addition, peaks observed in the experimental pattern corresponded to the simulated pattern calculated by Mercury using SCXRD data for the 2:3 PSZ-4ABA cocrystal, which demonstrated the formation of a pure crystalline phase of PSZ-4ABA cocrystal.

Differential Scanning Calorimetry (DSC)

DSC analysis was carried out with a TA Instrument (Neward, DE). Samples weighing approximately 1.5 mg were heated at a rate of 10° C./min and under nitrogen gas atmosphere (50 mL/min). Standard aluminum sample pans were used for all measurements.

The DSC thermograms displaying the thermal behavior of PSZ-4ABA cocrystal in comparison to the individual cocrystal components are shown in FIG. 4. The DSC thermogram of the cocrystal is distinctly different from that of the individual components. A single endothermic event corresponding to the cocrystal melting point was observed at 154.1±0.6° C., which is lower than PSZ (168.2±0.5° C.) and 4ABA (188.3±0.6° C.) melting points. The drug PSZ exhibits two endothermic events as described in the literature—a nematic-like phase transition at 134±1° C., and the drug melting point at 168.2±0.5° C.

Raman Spectroscopy

Figure 5:
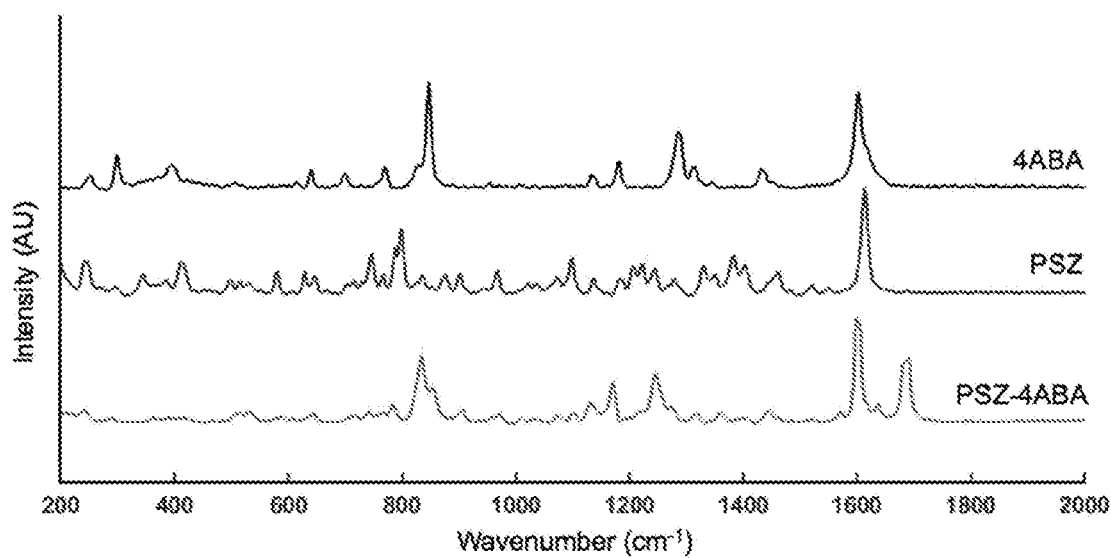
FIG. 5 shows Raman spectra of a cocrystal according to the disclosure (PSZ-4ABA), drug (PSZ), and coformer (4ABA).

Raman spectra of cocrystal powder and single crystals were collected with a WITec alpha300 R Confocal Raman Imaging Microscope (Ulm, Germany) equipped with a 50× air objective lens (Zeiss EC EPIPLAN, N.A.=0.75) and 532 nm solid-state excitation laser (0-55 mW, tunable intensity range with attenuator dial). The spectra are shown in FIGS. 5 and 6.

The Raman spectrum of the PSZ-4ABA cocrystal showed a new characteristic band at 1686 $cm^{-1}$ and several band shifts at 832, 1173, and 1242 $cm^{-1}$, compared to the individual cocrystal components.

Dissolution and Solubility Measurements

Blank FaSSIF (pH 6.50 phosphate buffer) was prepared at room temperature by dissolving 0.683 g of NaOH (pellets), 7.902 g of $NaH_2PO_4 \cdot H_2O$, and 12.372 g NaCl in 2 L of purified deionized (DI) water. The pH was adjusted to 6.50 (±0.04) with 1 M NaOH and 1 M HCl solutions. Blank FeSSIF (pH 5.00 acetate buffer) was prepared at room temperature by dissolving 8.089 g NaOH (pellets), 16.4 mL acetic acid, and 23.748 g NaCl in 2 L of purified DI water. The pH was adjusted to 5.00 (±0.03) with 1 M NaOH and 1 M HCl solutions. FaSSIF and FeSSIF media were prepared by dissolving appropriate amounts of FaSSIF/FeSSIF powder in the blank media according to the manufacturer, then stored at room temperature and used within 48 hours. Blank FaSSGF (pH 1.60 buffer) was prepared at room temperature by dissolving 1.999 g of sodium chloride in 1 L of DI water. The pH was adjusted to 1.60 (±0.05) with 2 M HCl solution.

Dissolution studies of drug or cocrystal were conducted using an overhead stirrer with a glass propeller at 150 rpm over three hours. Based on a 300 mg dose in 250 mL, 36 mg of PSZ drug or 46.6 mg PSZ-4ABA cocrystal (molar equivalent PSZ amount) were added to 30 mL of dissolution media. Dissolution studies were done in FaSSIF and FeSSIF with sieved fractions of drug and cocrystals in a particle size range of 106 to 125 μm. The dissolution experiments were conducted in a water bath at 25.0 (±0.5) ° C. Initial and final solution pH was measured. Aliquots of 0.5 mL were taken with a syringe at time points up to 180 minutes. The solution samples were filtered through syringe filter with PvDF membrane of a pore size of 0.45 μm. The solution concentrations of drug and coformer were analyzed with a Waters HPLC equipped with a photodiode array UV detector. A Waters Atlantis $C_{18}$ column with the dimension of 5 μm, 250×4.6 mm was used for separation. A gradient method using methanol and water with 0.1% trifluoroacetic acid was run with the flow rate set at 1 mL/min. The injection volume for PSZ solubility in blank media was 60 μL; all other solubility and dissolution studies had an injection volume of 20 μL. The wavelengths used for the analytes were 159 nm for PSZ, and 287 nm for 4ABA.

Figure 7:
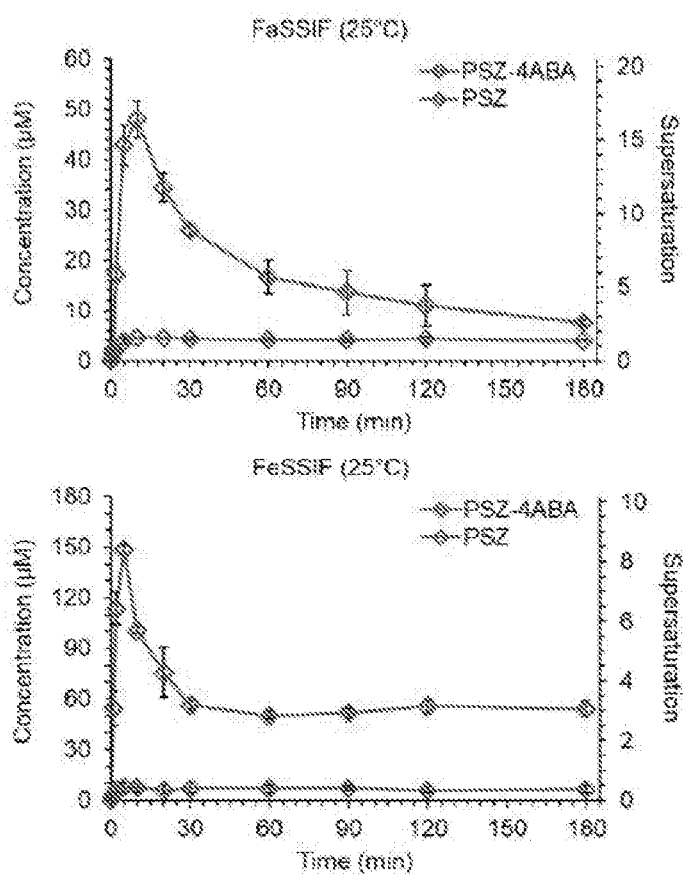
FIG. 7 is a graph of the drug concentrations during the dissolution of a cocrystal according to the disclosure (PSZ-4ABA) and drug (PSZ) in biorelevant media over time.

Cocrystal and drug dissolution behavior are shown in FIG. 7 and summarized in Table 1, below. The results showed that the cocrystal had superior dissolution properties compared to the drug crystal. The cocrystal generated drug concentrations that were 16 (FaSSIF) and 8 (FeSSIF) times greater than the drug solubility, and the drug concentrations were still higher than the drug solubility by 3-fold after 3 hours. Cocrystal dissolution led to a maximum of concentration of drug dissolved versus time ($C_{max}$) as a result of the interplay between cocrystal dissolution and drug precipitation. Cocrystal dissolution increases drug solution concentrations and drug precipitation lowers them. Cocrystal superior solubility, dissolution, and drug exposure levels are demonstrated by the cocrystal's higher area under the dissolution curve (AUC), as summarized in Table 1.

Cocrystal dissolution in both media generated supersaturation levels with respect to PSZ that were sustained for three hours. The supersaturation levels at 3 hours were 2.6-2.7 in both FaSSIF and FeSSIF. Furthermore, the cocrystal AUC was 4.1 times that of the drug in FaSSIF and 13 times that of the drug in FeSSIF. RAUCs are representative of drug increased exposure for cocrystals, are directly proportional to cocrystal dissolution and inversely proportional to drug precipitation or phase separation. These findings suggested that the PSZ-4ABA cocrystal has the potential to increase in vivo drug exposure compared to PSZ crystal.

Example 2—Evaluation of PSZ-4ABA Cocrystals

Cocrystals were prepared according to Example 1 and further evaluated.

Cocrystal eutectic constant ($K_{eu}$), which is well recognized as a key stability and solubility indicator, was determined from measurement of coformer and drug concentrations at the eutectic point, where drug and cocrystal solid phases are in equilibrium with solution according to $K_{eu}$ = $[\text{coformer}]_{eu}/[\text{drug}]_{eu}$. An excess amount of PSZ (approximately 200 mg) and 150 mg of PSZ-4ABA were suspended in 3 mL of blank FaSSGF, blank FaSSIF, blank FeSSIF, FaSSIF, or FeSSIF media. Biorelevant media included FaSSIF and FeSSIF. Blank media was the buffer solution in the biorelevant media without the lecithin and bile salt. The suspensions were kept in a water bath at 25.0±0.1° C. and magnetically stirred for up to 72-96 hours. Sample solutions were filtered through 0.45 μm cellulose acetate filters and analyzed by HPLC. The pH was measured and the equilibrium solids were characterized by DSC and PXRD.

$K_{eu}$ is proportional to the cocrystal solubility advantage over drug (SA=$S_{cc}/S_{drug}$), and for a 2:3 cocrystal is given by $$K_{eu} = 1.5\sqrt[3]{SA^5}$$

For the case of a 2:3 cocrystal, cocrystal solubility ($S_{cc}$) is higher than the drug solubility ($S_{drug}$) when $K_{eu}$ is higher than 1.5. $S_{cc}$ is lower than $S_{drug}$ when $K_{eu}$ is lower than 1.5. See is equal to $S_{drug}$ when $K_{eu}$ is equal to 1.5. The higher the $K_{eu}$ value, the higher is the cocrystal solubility advantage over drug (SA) and $S_{cc}$.

Table 3, below, shows the eutectic drug ($[\text{PSZ}]_{eu}$) and coformer ($[4\text{ABA}]_{eu}$) concentrations, $pH_{initial}$, pH at equilibrium ($pH_{eq}$), and solid phases at equilibrium, as well as the eutectic constant in buffers and biorelevant media.

TABLE 1

Cocrystal and Drug Dissolution Kinetic Parameters in Biorelevant Media

| Media | Solid Form | $C_{max}$ (μM) | $\sigma_{max}{}^a$ | AUC (μM × min) | RAUC$^b$ | Final pH |
|---|---|---|---|---|---|---|
| FaSSIF | PSZ-4ABA | 48 ± 4 | 16 ± 1 | 3052 ± 209 | 4.1 ± 0.3 | 6.37 ± 0.01 |
|  | PSZ | 4.5 ± 0.2 |  | 745 ± 18 |  | 6.58 ± 0.01 |
| FeSSIF | PSZ-4ABA | 148 ± 3 | 8.4 ± 0.2 | 15,670 ± 4612 | 13 ± 4 | 5.01 ± 0.01 |
|  | PSZ | 7 ± 3 |  | 1190 ± 104 |  | 4.95 ± 0.01 |

$^a\sigma_{max} = C_{max}/S_{PSZ}$
$^b$Relative area under the curve (RAUC = $AUC_{PSZ-4ABA}/AUC_{PSZ}$)

TABLE 3

| Media | Initial pH | Final pH | Solid phases at equilibrium | $[PSZ]_{eu}$ $(\times 10^{-2}$ mM$)^c$ | $[4ABA]_{eu}$ (mM) | $K_{eu}$ $(\times 10^5)^d$ |
|---|---|---|---|---|---|---|
| Blank FaSSIF | 6.55 ± 0.01 | 5.12 ± 0.03 | PSZ I$^a$ + PSZ-4ABA | 0.010 ± 0.004 | 17.4 ± 0.1 | 1.7 ± 0.6 |
| Blank FeSSIF | 5.03 ± 0.01 | 5.11 ± 0.01 | PSZ I + PSZ-4ABA | 0.012 ± 0.002 | 14.5 ± 0.2 | 1.2 ± 0.3 |
| Blank FaSSGF | 1.60 ± 0.01 | 1.94 ± 0.01 | PSZ II$^b$ + PSZ-4ABA | 8.3 ± 0.4 | 27.3 ± 0.4 | 0.0028 ± 0.0002 |
| FaSSIF | 6.50 ± 0.01 | 5.07 ± 0.04 | PSZ I + PSZ-4ABA | 0.36 ± 0.08 | 20.2 ± 0.4 | 0.06 ± 0.01 |
| FeSSIF | 5.03 ± 0.01 | 5.03 ± 0.14 | PSZ I + PSZ-4ABA | 1.8 ± 0.5 | 17.3 ± 0.5 | 0.010 ± 0.003 |

$^a$PSZ I is an anhydrous phase
$^b$PSZ II is a monohydrate phase
$^c$also corresponds to solubility of drug at equilibrium.
$^d$calculated from the ratio of coformer and drug concentrations at the eutectic point ($K_{eu}$ = [coformer]$_{eu}$/[drug]$_{eu}$).

Figure 8:
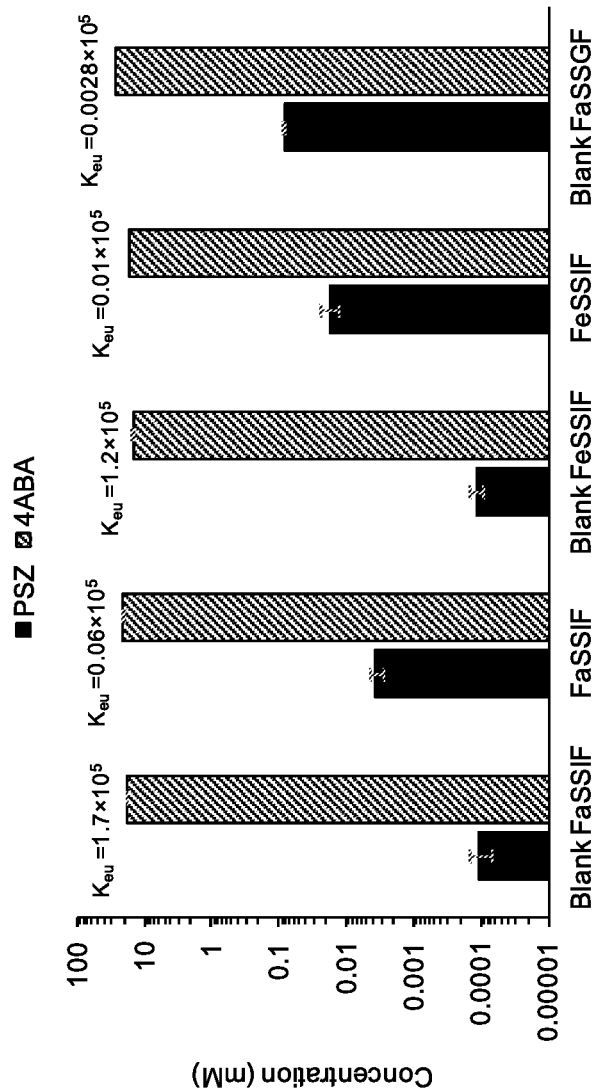
FIG. 8 is a graph of drug (PSZ) and coformer (4ABA) concentrations at the cocrystal and drug eutectic point and the corresponding cocrystal (PSZ-4ABA) $K_{eu}$ values in buffers and biorelevant media.

The relationship between $K_{eu}$ and cocrystal solubility is $K_{eu}$=1.5 $(S_{co}/S_{drug})^{5/3}$. The results in FIG. 8 indicated that cocrystal solubility ($S_{co}$) was higher than that of the drug under all media conditions used since $K_{eu}$>1.5. Thus, the cocrystal may have the potential to generate supersaturation with respect to the drug and to undergo solution-mediated conversion. In addition, $K_{eu}$ values in buffers (blank FaSSIF and FeSSIF) were reduced in the presence of drug solubilizing agents in FaSSIF and FeSSIF media, indicating a decrease in SA or the cocrystal solubility advantage over drug ($S_{co}/S_{drug}$).

The influence of pH on drug crystal (PSZ) and cocrystal (PSZ-4ABA) solubilities was determined by analyzing $[PSZ]_{eu}$, $[4ABA]_{eu}$, and $K_{eu}$ dependence on pH. $[PSZ]_{eu}$ corresponds to the PSZ solubility and decreases 700 to 800 times as pH increases from 1.9 to 5.1, whereas $S_{co}$ decreases 20 times in the same pH range. This indicated that PSZ-4ABA cocrystal had a much weaker dependence on pH than the drug crystal.

REFERENCES

1. Courtney, R.; Wexler, D.; Radwanski, E.; Lim, J.; Laughlin, M., Effect of food on the relative bioavailability of two oral formulations of posaconazole in healthy adults. Brit J Clin Pharmaco 2004, 57 (2), 218-222.
2. Ezzet, F.; Wexler, D.; Courtney, R.; Krishna, G.; Lim, J.; Laughlin, M., Oral Bioavailability of Posaconazole in Fasted Healthy Subjects. Clinical pharmacokinetics 2005, 44 (2), 211-220.
3. Krishna, G.; Moton, A.; Ma, L.; Medlock, M. M.; McLeod, J., Pharmacokinetics and Absorption of Posaconazole Oral Suspension under Various Gastric Conditions in Healthy Volunteers. Antimicrobial Agents and Chemotherapy 2009, 53 (3), 958966.
4. Walravens, J.; Brouwers, J.; Spriet, I.; Tack, J.; Annaert, P.; Augustijns, P., Effect of pH and comedication on gastrointestinal absorption of posaconazole: monitoring of intraluminal and plasma drug concentrations. Clinical pharmacokinetics 2011, 50 (11), 725-34.
5. Chen, Y. M.; Rodriguez-Hornedo, N., Cocrystals Mitigate Negative Effects of High pH on Solubility and Dissolution of a Basic Drug. Cryst Growth Des 2018, 18 (3), 1358-1366.
6. Cavanagh, K. L.; Maheshwari, C.; Rodriguez-Hornedo, N., Understanding the Differences Between Cocrystal and Salt Aqueous Solubilities. J. Pharm. Sci. 2018, 107 (1), 113-120.
7. Kuminek, G.; Rodriguez-Hornedo, N.; Siedler, S.; Rocha, H. V.; Cuffini, S. L.; Cardoso, S. G., How cocrystals of weakly basic drugs and acidic coformers might modulate solubility and stability. Chem Commun (Camb) 2016, 52 (34), 5832-5.
8. Bethune, S. J.; Huang, N.; Jayasankar, A.; Rodriguez-Hornedo, N., Understanding and Predicting the Effect of Cocrystal Components and pH on Cocrystal Solubility. Cryst Growth Des 2009, 9 (9), 3976-3988.
9. Kuminek, G.; Cavanagh, K. L.; Rodriguez-Hornedo, N., Measurement and Mathematical Relationships of Cocrystal Thermodynamic Properties. In Pharmaceutical Crystals, Li, T.; Mattei, A., Eds. John Wiley & Sons, Inc.: 2019.
10. Avdeef, A., pKa Determination. In Absorption and Drug Development, 2nd ed.; Avdeef, A., Ed. John Wiley & Sons, Inc.: 2012.
11. Wang, S.; Liu, C.; Chen, Y.; Zhu, A.; Qian, F., Aggregation of Hydroxypropyl Methylcellulose Acetate Succinate under Its Dissolving pH and the Impact on Drug Supersaturation. Molecular Pharmaceutics 2018, 15 (10), 4643-4653.
12. FDA, Noxafil Tablets Clinical Pharmacology and Biopharmaceutics Review(s). Center for Drug Evaluation and Research 2013, Application Number 205053Orig1s000.
13. Bak, A., et al., The Co-Crystal Approach to Improve the Exposure of a Water-Insoluble Compound: AMG 517 Sorbic Acid Co-Crystal Characterization and Pharmacokinetics. Journal of Pharmaceutical Sciences, 2008. 97(9): p. 3942-3956.
14. Shan, N., et al., Impact of pharmaceutical cocrystals: the effects on drug pharmacokinetics. Expert Opinion on Drug Metabolism & Toxicology, 2014. 10(9): p. 1255-1271.
15. Schultheiss, N. and A. Newman, Pharmaceutical Cocrystals and Their Physicochemical Properties. Crystal Growth & Design, 2009. 9(6): p. 2950-2967.
16. Taylor, L. S. and G. G. Z. Zhang, Physical chemistry of supersaturated solutions and implications for oral absorption. Advanced Drug Delivery Reviews, 2016. 101: p. 122142.
17. Berry, D. J. and J. W. Steed, Pharmaceutical cocrystals, salts and multicomponent systems; intermolecular interactions and property based design. Advanced Drug Delivery Reviews, 2017. 117: p. 3-24.

18. Cao, F., et al., *Mechanistic Basis of Cocrystal Dissolution Advantage.* Journal of Pharmaceutical Sciences, 2018. 107(1): p. 380-389.
19. Good, D. J. and N. Rodríguez-Hornedo, *Solubility Advantage of Pharmaceutical Cocrystals.* Crystal Growth & Design, 2009. 9(5): p. 2252-2264.
20. Martin, F. A., et al., *Ketoconazole Salt and Co-crystals with Enhanced Aqueous Solubility.* Crystal Growth & Design, 2013. 13(10): p. 4295-4304.
21. Cao, F. J., N. Rodriguez-Hornedo, and G. E. Amidon, *Mechanistic Analysis of Cocrystal Dissolution, Surface pH, and Dissolution Advantage as a Guide for Rational Selection.* Journal of Pharmaceutical Sciences, 2019. 108(1): p. 243-251.
22. Chen, Y. M. and N. Rodríguez-Hornedo, *Cocrystals Mitigate Negative Effects of High pH on Solubility and Dissolution of a Basic Drug.* Crystal Growth & Design, 2018. 18(3): p. 1358-1366.
23. Kuminek, G., et al., *Cocrystals to facilitate delivery of poorly soluble compounds beyond-rule-of-5.* Adv Drug Deliv Rev, 2016. 101: p. 143-66.
24. Childs, S. L., P. Kandi, and S. R. Lingireddy, *Formulation of a danazol cocrystal with controlled supersaturation plays an essential role in improving bioavailability.* Mol Pharm, 2013. 10(8): p. 3112-27.
25. McNamara, D. P., et al., *Use of a glutaric acid cocrystal to improve oral bioavailability of a low solubility API.* Pharm Res, 2006. 23(8): p. 1888-1897.
26. Diakidou, A., et al., *Estimation of Intragastric Drug Solubility in the Fed State: Comparison of Various Media with Data in Aspirates.* Biopharmaceutics & Drug Disposition, 2009. 30(6): p. 318-325.
27. Cristofoletti, R., N. Patel, and J. B. Dressman, *Differences in Food Effects for 2 Weak Bases With Similar BCS Drug-Related Properties: What Is Happening in the Intestinal Lumen?* J Pharm Sci, 2016. 105(9): p. 2712-2722.
28. Schiller, D. S. and H. B. Fung, *Posaconazole: An extended-spectrum triazole antifungal agent.* Clinical Therapeutics, 2007. 29(9): p. 1862-1886.
29. Hens, B., et al., *Evaluation and optimized selection of supersaturating drug delivery systems of posaconazole (BCS class 2b) in the gastrointestinal simulator (GIS): An in vitro-in silico-in vivo approach.* Eur J Pharm Sci, 2018. 115: p. 258-269.
30. Walravens, J., et al., *Effect of pH and comedication on gastrointestinal absorption of posaconazole: monitoring of intraluminal and plasma drug concentrations.* Clin Pharmacokinet, 2011. 50(11): p. 725-34.
31. Chen, Y., et al., *Sodium Lauryl Sulfate Competitively Interacts with HPMC-AS and Consequently Reduces Oral Bioavailability of Posaconazole/HPMC-AS Amorphous Solid Dispersion.* Molecular Pharmaceutics, 2016. 13(8): p. 2787-2795.
32. Shevchenko, A., et al., *A new cocrystal and salts of itraconazole: Comparison of solid-state properties, stability and dissolution behavior.* International Journal of Pharmaceutics, 2012. 436(1): p. 403-409.
33. Shevchenko, A., et al., *Diversity in Itraconazole Cocrystals with Aliphatic Dicarboxylic Acids of Varying Chain Length.* Crystal Growth & Design, 2013. 13(11): p. 4877-4884.
34. Dayo Owoyemi, B. C., et al., *Fluconazole: Synthesis and Structural Characterization of Four New Pharmaceutical Cocrystal Forms.* Crystal Growth & Design, 2019. 19(2): p. 648-657.
35. Kastelic, J., et al., *Fluconazole Cocrystals with Dicarboxylic Acids.* Crystal Growth & Design, 2010. 10(11): p. 4943-4953.
36. Kastelic, J., et al., *A 1:1 cocrystal of fluconazole with salicylic acid.* Vol. 67. 2011. o3702.
37. Kumar, S. S., R. Thakuria, and A. Nangia, *Pharmaceutical cocrystals and a nitrate salt of voriconazole.* Vol. 16. 2014. 4722-4731.
38. McQuiston, D. K., M. R. Mucalo, and G. C. Saunders, *The structure of posaconazole and its solvates with methanol, and dioxane and water: Difluorophenyl as a hydrogen bond donor.* Journal of Molecular Structure, 2019. 1179: p. 477-486.
39. Adrjanowicz, K., et al., *Molecular Dynamics of the Supercooled Pharmaceutical Agent Posaconazole Studied via Differential Scanning Calorimetry and Dielectric and Mechanical Spectroscopies.* Molecular Pharmaceutics, 2013. 10(10): p. 3934-3945.

What is claimed is:

1. A cocrystal comprising posaconazole and a coformer, wherein the coformer comprises 4-aminobenzoic acid (4ABA), characterized by an X-ray powder diffraction (XRPD) pattern comprising peaks at 5.8, 10.3, 11.5, 18.9, 19.3, 21.7, 22.4±0.2° 2θ using Cu Kα radiation.

2. The cocrystal of claim 1, wherein posaconazole and 4ABA are present in a molar ratio of 1:4 to 4:1 posaconazole:4ABA.

3. The cocrystal of claim 1, further characterized by XRPD pattern peaks at 12.9, 13.3, 20.1, 25.0, 25.3, 26.3±0.2° 2θ using Cu Kα radiation.

4. The cocrystal of claim 1, wherein the endothermic transition is at 154.1±0.6° C., as measured by differential scanning calorimetry (DSC).

5. A pharmaceutical composition comprising the cocrystal of claim 1 and a pharmaceutically acceptable carrier.

6. The composition of claim 5, as a tablet, capsule, or suspension.

* * * * *